United States Patent
Hedges et al.

(10) Patent No.: US 9,944,024 B2
(45) Date of Patent: Apr. 17, 2018

(54) IMPROVEMENTS RELATING TO THE MANUFACTURE OF WIND TURBINES

(71) Applicant: Vestas Wind Systems A/S, Aarhus N. (DK)

(72) Inventors: Andrew Hedges, London Greater London (GB); Damien Rajasingam, East Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 347 days.

(21) Appl. No.: 14/678,033

(22) PCT Filed: Sep. 30, 2013

(86) PCT No.: PCT/DK2013/050310
§ 371 (c)(1),
(2) Date: Apr. 3, 2015

(87) PCT Pub. No.: WO2014/053142
PCT Pub. Date: Apr. 10, 2014

(65) Prior Publication Data
US 2016/0354984 A1      Dec. 8, 2016

Related U.S. Application Data

(60) Provisional application No. 61/710,089, filed on Oct. 5, 2012.

(30) Foreign Application Priority Data

Oct. 5, 2012   (DK) ................................ 2012 70611

(51) Int. Cl.
  *B29C 70/38*   (2006.01)
  *B29C 31/08*   (2006.01)
  (Continued)

(52) U.S. Cl.
  CPC ............ *B29C 70/382* (2013.01); *B29C 70/38* (2013.01); *B29D 99/0025* (2013.01);
  (Continued)

(58) Field of Classification Search
  CPC ..... B29C 70/38; B29C 70/382; B29C 70/384; B29C 31/08; B29C 31/066;
  (Continued)

(56) References Cited

U.S. PATENT DOCUMENTS 4,557,790 A * 12/1985 Wisbey ................. B29C 70/388
                                                                156/178
4,588,466 A *  5/1986 Eaton ..................... B29C 70/386
                                                                156/235

(Continued)

FOREIGN PATENT DOCUMENTS

EP   2230070 A1   9/2010
WO   2011035539 A1   3/2011
(Continued)

OTHER PUBLICATIONS

International Searching Authority, International Search Report Issued in corresponding Application No. PCT/DK2013/050310, dated Jul. 1, 2014, 10 pages.
(Continued)

*Primary Examiner* — Robert B Davis
(74) *Attorney, Agent, or Firm* — Wood Herron & Evans LLP (57) ABSTRACT

A production system for a wind turbine component is described. The system includes an elongate mold assembly extending in a longitudinal direction, the mold assembly comprising a mold surface and having a width that varies in the longitudinal direction. First and second tracks are defined respectively on opposite longitudinal sides of the mold surface. The perpendicular distance between the
(Continued)

respective tracks varies along the length of the track. A transport assembly is moveable relative the mold assembly in the longitudinal direction. The transport assembly includes a pair of side supports arranged to move along the respective tracks, and a gantry supported above the mold assembly by the side supports. The gantry extends transverse to the longitudinal direction. The transport assembly is configured such that the side supports move relative to one another in a direction transverse to the longitudinal direction in accordance with the varying distance between the tracks as the transport assembly moves in the longitudinal direction.

20 Claims, 10 Drawing Sheets (51) Int. Cl.
*B29D 99/00* (2010.01)
*F03D 1/06* (2006.01)
*B29L 31/08* (2006.01)

(52) U.S. Cl.
CPC ...... *F03D 1/0675* (2013.01); *B29L 2031/085* (2013.01); *F05B 2230/00* (2013.01); *F05B 2230/31* (2013.01); *Y02E 10/721* (2013.01); *Y02P 70/523* (2015.11)

(58) Field of Classification Search
CPC ........... B29D 99/0025; B29L 2031/085; F03D 1/0675; Y02P 70/523
USPC ........................................................ 156/245
See application file for complete search history.

(56) References Cited

U.S. PATENT DOCUMENTS

| 8,602,761 | B2* | 12/2013 | Arrizabalaga | .......... B29C 70/38 |
| | | | | 156/350 |
| 2010/0024215 | A1 | 2/2010 | Torres Martinez et al. | |
| 2012/0138218 | A1* | 6/2012 | Dean | ........................ B29C 70/38 |
| | | | | 156/243 |
| 2014/0322023 | A1* | 10/2014 | Tapia | ...................... B29C 70/38 |
| | | | | 416/223 R |

FOREIGN PATENT DOCUMENTS

| WO | WO 2011035539 A1 * | 3/2011 | ........... B29C 31/044 |
| WO | 2012093136 A2 | 7/2012 | |
| WO | WO-2017134027 A1 * | 8/2017 | .............. B29C 70/38 |

OTHER PUBLICATIONS

Danish Patent and Trademark Office, Danish Search Report and Written Opinion issued in corresponding Application No. PA 2012 70611, dated May 21, 2013, 4 pages.

* cited by examiner

IMPROVEMENTS RELATING TO THE MANUFACTURE OF WIND TURBINES

TECHNICAL FIELD

The present invention relates generally to the manufacture of elongate wind turbine components, and to material handling techniques used in automated and semi-automated manufacturing processes.

BACKGROUND

Automated and semi-automated manufacturing processes are being used increasingly in the production of wind turbine components such as wind turbine blades. Examples of such processes include the application of gel coats to moulds, the layup of fibrous materials in the moulds and the application of adhesive to moulded parts.

Figure 1:
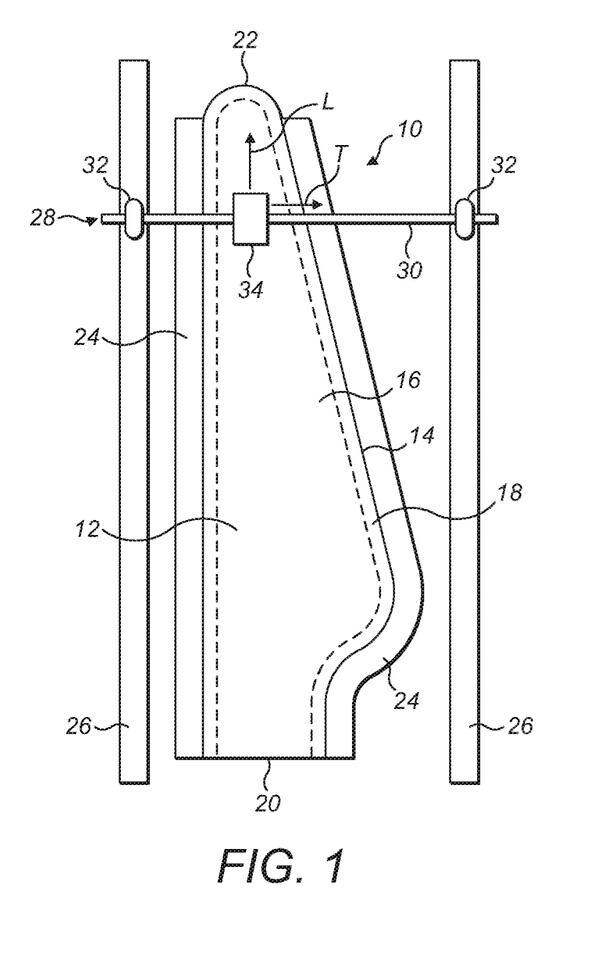

A prior art production system for a wind turbine blade is illustrated schematically in the plan view of FIG. 1. Referring to FIG. 1, the system comprises an elongate mould assembly 10 in which a half shell 12 of a wind turbine blade is formed. The mould assembly 10 comprises a female mould 14 defining a generally concave mould surface 16, which is surrounded by a generally flat mould flange 18. The mould assembly 10 tapers inwardly moving from a root end 20 to a tip end 22, such that the tip end 22 of the mould assembly 10 is considerably narrower than the root end 20.

Walkways 24 in the form of platforms are provided alongside the mould assembly 10. The walkways 24 are raised significantly off the ground and are utilised extensively by personnel during the production of the blades to facilitate inspection of, and access to, the mould surface 16 and the surrounding flange 18.

A pair of parallel tracks 26 extends longitudinally along the factory floor on respective longitudinal sides of the mould assembly 10. The tracks 26 are provided outboard of the walkways 24 and at a sufficient distance from the mould assembly 10 to allow space for the walkways 24. A transport assembly 28 is arranged on the tracks 26. The transport assembly comprises a gantry 30, which extends in a transverse direction above the mould assembly 10. The gantry 30 is supported by a pair of vertical side supports 32, which are arranged respectively on opposite longitudinal sides of the mould assembly 10. The side supports 32 are provided on the tracks 26, and the transport assembly 28 is configured to travel along the tracks 26 to move the gantry 30 above the mould 14 in a longitudinal direction L.

A robot 34 having a suitable application device is mounted on the gantry 30 above the mould 14. The robot 34 is arranged to move in a transverse direction T along the gantry 30. The robot 34 may also be arranged to move vertically relative to the mould 14 and may have additional rotational degrees of freedom, for example a six-axis gantry robot. An example of an automated production system is described in WO2011/035539A1.

Figure 2:
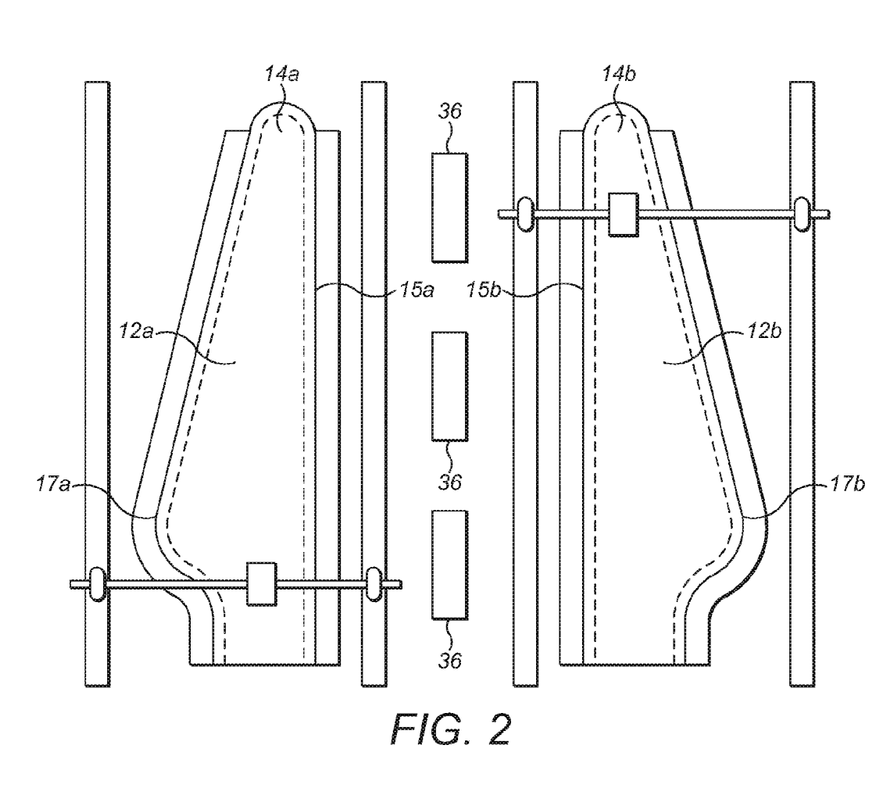

Referring to FIG. 2, wind turbine blades are typically formed from two half shells 12a, 12b, which are manufactured separately in two side-by-side female moulds 14a, 14b. Once the half-shells 12a, 12b have been moulded, adhesive is applied along the leading edges 15a, 15b and trailing edges 17a, 17b of the shells 12a, 12b, and one of the moulds is lifted, turned and arranged on top of the other mould to bond the half-shells 12a, 12b together to form the complete blade. A lifting and turning mechanism 36 is provided between the moulds 14a, 14b for this purpose.

The blades for the latest generation of utility-scale wind turbines are around eighty meters in length and have a root diameter of around five meters. It will therefore be appreciated that the mould assemblies described above are very large. In view of the large size of the moulds, it will be appreciated that the automated production systems described above and in WO2011/035539A1 are expensive to produce and occupy a considerable amount of factory floor space. Careful design considerations must also be employed to ensure that the tracks between the mould assemblies do not interfere with the lifting and turning mechanism 36 provided in this region, and vice versa.

There is a continuing drive to reduce the cost of manufacturing processes, and factory floor space is also at a premium. Against this background, the present invention aims to provide a more compact and inexpensive production facility for the manufacture of wind turbine blades.

SUMMARY OF THE INVENTION

According to the present invention there is provided a production system for a wind turbine component, the system comprising: an elongate mould assembly extending in a longitudinal direction, the mould assembly comprising a mould surface and having a width that varies in the longitudinal direction; first and second tracks defined respectively on opposite longitudinal sides of the mould surface, the tracks extending longitudinally; and a transport assembly moveable relative to the mould assembly in the longitudinal direction, the transport assembly comprising a pair of side supports arranged respectively to move along the first and second tracks, and a gantry supported above the mould assembly by the pair of side supports, the gantry extending transverse to the longitudinal direction, characterised in that the perpendicular distance between the respective tracks varies along the length of the tracks; and the transport assembly is configured such that the side supports move relative to one another in a direction transverse to the longitudinal direction in accordance with the varying distance between the tracks as the transport assembly moves in the longitudinal direction.

The production system of the present invention is cheaper and occupies less factory floor space than prior art systems. Whereas the tracks of prior art systems are parallel along the entire length of the mould assembly, the tracks of the present invention are non-parallel at least in places. The varying separation between the tracks allows the tracks to follow the contour of the mould assembly, and hence significant amounts of factory floor space can be made available for other purposes, especially alongside relatively narrow parts of the mould assembly.

The tracks may be provided on the walkways adjacent the mould, or on the mould flange to further reduce the required factory space and increase the compactness of the system. It is conceivable that one track may be provided on the mould flange and the other track provided on a walkway. However, in preferred embodiments both tracks are provided on the respective walkways, or both tracks are provided on the mould flange. These arrangements further reduce the required width of the gantry compared to systems in which the tracks are provided outboard of the walkway, and hence the materials cost of the system is greatly reduced.

It will be appreciated that the production system is suitable for use in the production of other wind turbine components such as the spars or parts of the spars of blades.

The invention also provides a method of making an elongate wind turbine component, the method comprising:

providing an elongate mould assembly extending in a longitudinal direction, the mould assembly comprising a mould surface and having a width that varies in the longitudinal direction; defining first and second tracks respectively on opposite longitudinal sides of the mould surface, the tracks extending longitudinally and the perpendicular distance between the tracks varying along the length of the tracks; providing a transport assembly comprising a pair of side supports arranged respectively to move along the first and second tracks, and a gantry supported above the mould assembly by the pair of side supports, the gantry extending transverse to the longitudinal direction; moving the transport assembly relative to the mould assembly in the longitudinal direction; depositing material in the mould by means of the transport assembly; and moving the side supports relative to one another in a direction transverse to the longitudinal direction in accordance with the varying distance between the tracks as the transport assembly moves in the longitudinal direction.

Other optional features of the present invention are recited in the dependent claims, and it will be appreciated that optional features claimed herein or otherwise recited in relation to the invention when expressed in apparatus terms are equally applicable to the invention when expressed in method terms, and vice versa.

BRIEF DESCRIPTION OF THE DRAWINGS

FIGS. 1 and 2 have already been described above by way of background to the present invention. In order that the present invention may be more readily understood, examples of the invention will now be described with reference to the accompanying drawings, in which:

FIG. 5b is a variant of the gantry-mounted robot of FIG. 5a;

FIG. 6b is a side view of the wheel unit of FIG. 6a;

FIG. 7b shows a three axis universal joint, which is an alternative to the ball joint shown in FIG. 7a;

FIG. 13 shows a variant of the track and wheel unit of FIG. 6a; and

DETAILED DESCRIPTION

Figure 3:
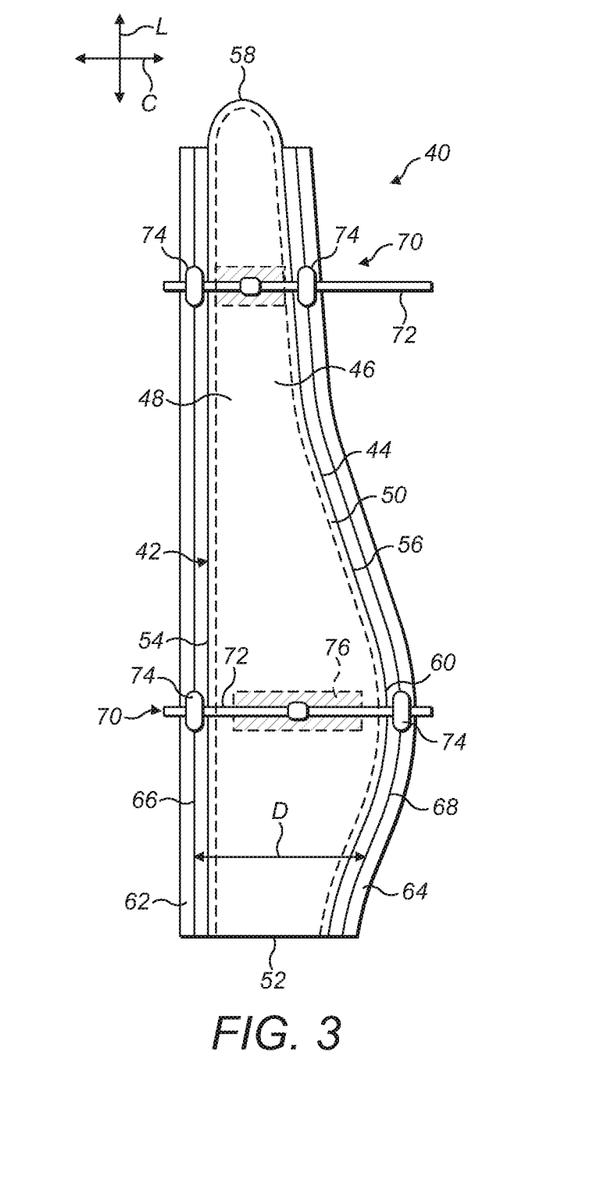
FIG. 3 is a plan view of a wind turbine blade production system according to an embodiment of the present invention in which a pair of tracks is provided on respective walkways alongside a mould, and a transport assembly comprising a gantry-mounted robot is arranged on the tracks.

Referring to FIG. 3, a production system 40 for a wind turbine blade in accordance with an embodiment of the present invention is shown in plan view. The production system 40 comprises a mould assembly 42 comprising a female mould 44 for a half shell 46 of the wind turbine blade. The mould 44 comprises a concave mould surface 48 surrounded by a substantially flat mould flange 50. In this example, the mould 44 is approximately eighty meters in length and has a diameter at the root end 52 of approximately five meters.

The mould 44 comprises a leading edge 54 and a trailing edge 56, which each extend in a generally longitudinal sense L from the root end 52 of the mould 44 to a tip end 58 of the mould 44. The leading edge 54 is relatively straight whilst the trailing edge 56 exhibits significant curvature. As shown in FIG. 3, the trailing edge 56 initially curves outwardly from the root end 52 of the mould 44 to a region of maximum chord 60, and thereafter curves inwardly moving from the maximum chord 60 to the tip end 58 of the mould 44. Accordingly, the width of the mould 44 varies moving longitudinally L, such that the tip end 58 of the mould 44 is considerably narrower than the root end 52. The width of the mould 44 is defined herein as the chordwise distance between the leading edge 54 and the trailing edge 56.

A first walkway 62 is provided alongside the leading edge 54 of the mould assembly 40 and a second walkway 64 is provided alongside the trailing edge 56 of the mould assembly 40. The walkways 62, 64 comprise platforms that are raised significantly off the ground and allow personnel to access and inspect the mould 44. The first walkway 62 is substantially straight, whilst the second walkway 64 generally follows the curvature of the trailing edge 56.

A first track 66 is provided on the first walkway 62 and a second track 68 is provided on the second walkway 64. The first track 66 is substantially straight whilst the second track 68 is generally curved in accordance with the curvature of the trailing edge 56 of the mould 44. Due to the varying width of the mould 44, the perpendicular distance D between the first 66 and second 68 tracks varies along the length of the mould 44. The perpendicular distance D between the tracks 66, 68 is at a maximum at the maximum chord 60 of the mould 44, and at a minimum near the tip end 58 of the mould 44.

Comparing FIGS. 1 and 3, it will be appreciated that the production system 40 occupies significantly less factory floor space than the prior art system. This results firstly from the provision of a curved track 68, which follows the contour of the trailing edge 56 of the mould 44. In comparison to the straight track 26 in the prior art, the curved track 68 results in significant floor space being made available adjacent parts of the trailing edge 56 where the blade becomes narrow, for example between the maximum chord 60 and the tip 58 of the mould 44. Secondly, the amount of factory floor space required by the present system 40 is reduced by virtue of the provision of the tracks 66, 68 on the walkways 62, 64 adjacent the mould assembly 42, as opposed to on the factory floor outboard of those walkways 62, 64, which is the arrangement used in the prior art.

A transport assembly 70 is arranged on the tracks 66, 68. The transport assembly 70 comprises a gantry 72 in the form of a rail, which is supported above the mould 44. The gantry 72 extends in the chordwise direction C across the mould 44. Referring also to the cross-sectional view of FIG. 4, the gantry 72 is supported by a pair of vertical side supports 74, which are arranged respectively on opposite longitudinal sides of the mould 44.

Figure 5A:
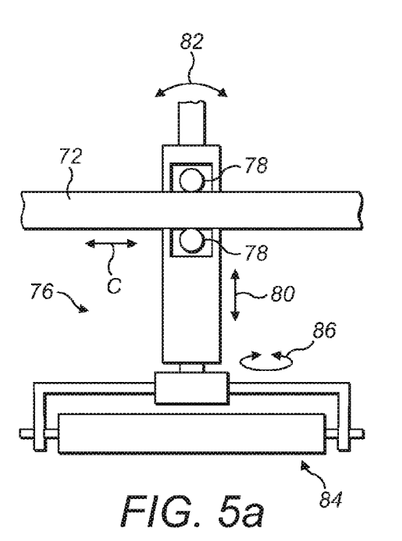
FIG. 5a is a detailed view of the gantry-mounted robot shown in FIG. 4.

A robot 76 is mounted on the gantry 72. The robot 76 is shown in more detail in FIG. 5a. Referring to FIG. 5a, the robot 76 is arranged to move along the gantry rail 72 in the chordwise direction C by virtue of drive units 78. The robot 76 is also able to move vertically 80 and alter its inclination 82 relative to the gantry rail 72. The robot 76 comprises an end effector unit 84, which supports a roll of fibrous sheet material to be placed in the mould 44. As the transport assembly 70 is moved along the tracks 66, 68, the fibrous material is unrolled from the roll and placed in the mould 44. This process may be fully automated, or semi-automated, for example the fibrous material may be manually placed in the mould 44, with the transport assembly 70 facilitating material handling during this semi-automated manual layup process. It will be appreciated that movement of the transport assembly 70 and/or of the end effector unit 84 can be controlled manually or automatically.

Figure 5B:
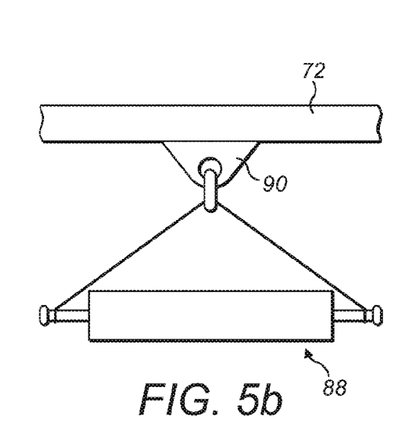

In other examples, the end effector unit 84 may comprise an adhesive or gel-coat applicator, or any other suitable gantry-mountable equipment such as an automated fibre placement unit for depositing fibre tows in the mould 44. The end effector unit 84 is also rotatable, as indicated by the circular arrows 86, to enable precise control of its orientation relative to the mould surface 48 (FIG. 3). FIG. 5b shows a variant of the system in which the robot is replaced with a simple roller assembly 88 suspended from a mounting point 90 on the gantry rail 72.

Referring again to FIG. 3, the transport assembly 70 is arranged to travel along the respective tracks 66, 68 provided on the respective walkways 62, 64 to move the gantry 72 longitudinally above the mould. The gantry 72 is moveable along the entire length of the mould 44. As the gantry 72 moves longitudinally L above the mould 44, the effective width of the gantry 72 varies in accordance with the varying separation D between the tracks 66, 68. The effective width of the gantry 72 is defined by the distance between the respective side supports 74.

To vary the effective width of the gantry 72, the side supports 74 move towards or away from one another in the chordwise direction C as the transport assembly 70 moves longitudinally L. The mechanisms for effecting this chordwise movement will be described in more detail below. Two longitudinal positions of the gantry 72 are shown by way of example in FIG. 3. In the first position, the transport assembly 70 is located at the position of maximum chord 60, whilst in the second position the transport assembly 70 is located near the tip end 58 of the mould 44. The respective side supports 74 of the transport assembly 70 are spaced relatively far apart in the first position and relatively close together in the second position.

Figure 4:
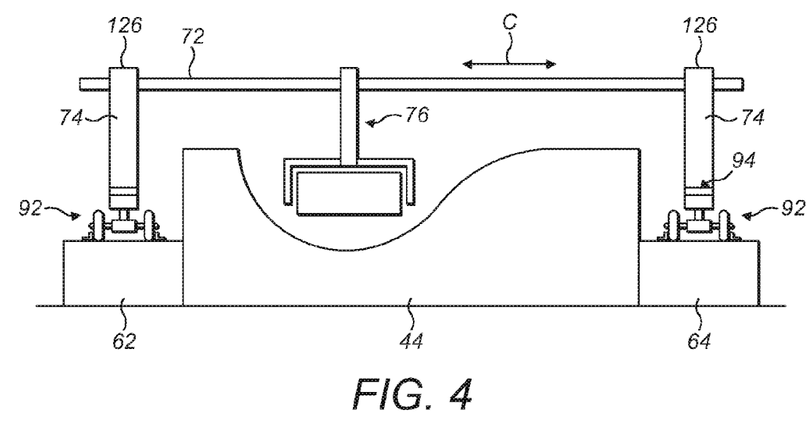
FIG. 4 is a cross-sectional view of the production system of FIG. 3.

As shown in FIG. 4, a wheel unit 92 is provided at the base 94 of each of the side supports 74. One of these wheel units 92 is shown in more detail in the close-up views of FIGS. 6a and 6b. Referring to these figures, the wheel unit comprises a pair of front wheels 96 mounted respectively at opposite ends of a horizontal front axle 98, and a pair of rear wheels 100 mounted respectively at opposite ends of a horizontal rear axle 102. The front and rear axles 98, 102 are supported respectively by front and rear steering blocks 104, 106. The steering blocks 104, 106 are rotatably mounted to an underside 108 of a base plate 110 of the vertical side support 74 by respective front and rear vertical spindles 112, 114. As represented by the circular arrows 116 and 118, the steering blocks 104, 106 are arranged to turn about respective vertical axes 117, 119 defined by the respective vertical spindles 112, 114 to effect steering of the wheel unit 92.

Figure 6A:
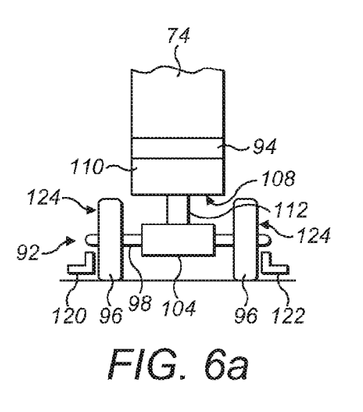
FIG. 6a is an end view of a wheel unit of the transport assembly of FIGS. 3 and 4.

As shown in FIG. 6a, the tracks 66, 68 on the walkways 62, 64 each comprise first and second guide rails 120, 122 in the form of upstanding flanges. The separation between the first and second guide rails 120, 122 is approximately equal to, although marginally larger than the separation between the outer sides 124 of the respective front and rear wheel pairs 96, 100, such that the wheel unit 92 is accommodated between the rails 120, 122. The rails 120, 122 guide and constrain the wheel unit 92 to follow the tracks 66, 68 shown in FIG. 3. As the transport unit 70 is moved longitudinally L, the steering blocks 104, 106 turn about the vertical axes 117, 119 defined by the respective spindles 112, 114 to effect steering of the wheel units 92 along curved parts of the track 68.

Figure 6B:
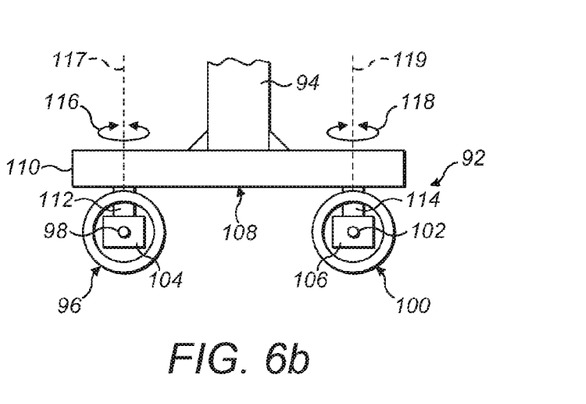
Figure 6C:
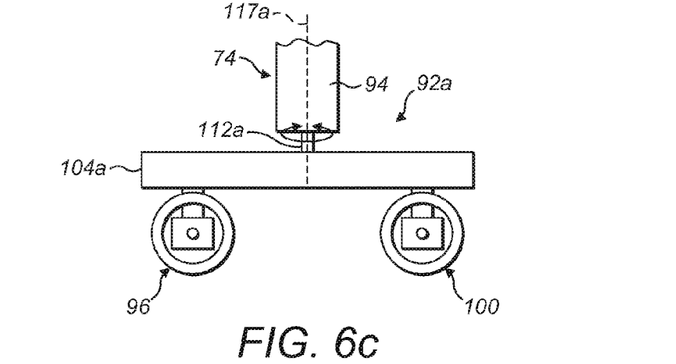
FIG. 6c is a side view of a variant of the wheel unit shown in FIGS. 6a and 6b.

Referring to FIG. 6c, this shows a variant of the wheel unit of FIGS. 6a and 6b. In FIG. 6c, a bogie assembly 92a is pivotally mounted to the base 94 of the side support 74 by a spindle 112a. The bogie assembly 92a comprises a chassis 104a to which both wheel pairs 96, 100 are mounted. In use, the bogie assembly 92a swivels about a vertical axis 117a defined by the spindle 112a to effect steering along curved parts of the track 68.

Figure 7A:
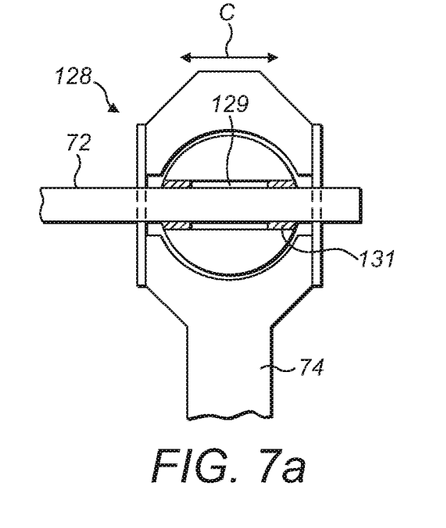
FIG. 7a shows an articulated ball joint between the gantry and side supports of the transport assembly of FIG. 3.

Referring again to FIG. 4, the gantry rail 72 is slidably mounted to the upper ends 126 of the vertical side supports 74. The coupling between the gantry rail 72 and the side supports 74 is in the form of an articulated ball joint 128 as shown in FIG. 7a. The gantry rail 72 is slidable within an elongate passage 129 defined through the vertical side supports 74 and through the ball 128. Bearing means 131 are provided inside the passage 129 between the gantry rail 72 and the ball 128 to facilitate the smooth sliding of the gantry rail 72 with respect to the side supports 74 in the chord wise direction C. The bearing means 131 may be provided by rollers or sliding contact bearings for example.

Figure 7B:
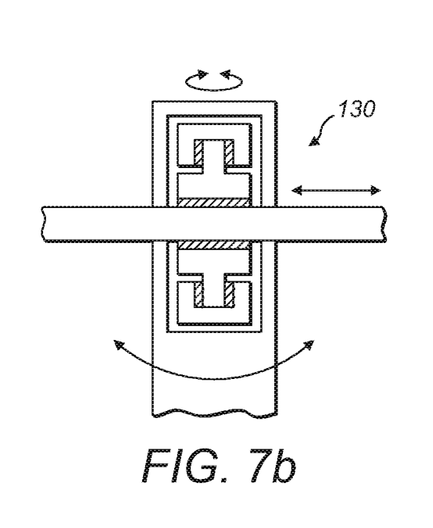

The sliding ball joint 128 allows the side supports 74 to move relative to one another in the chordwise direction C to vary the effective width of the gantry 72 when the transport assembly 70 moves longitudinally. The ball joint 128 serves to maintain coaxial alignment between the gantry rail 72 and the elongate passage 129 when the side support 74 turns. This prevents the gantry rail 72 from jarring as it slides relative to the side supports 74. FIG. 7b shows a three-axis universal joint 130, which may be employed as an alternative to the ball joint 128 shown in FIG. 7a.

As shown in FIG. 3, the effect of the sliding relationship between the gantry rail 72 and the side support 74 is that when the transport assembly 70 is positioned over a relatively narrow part of the mould 44, the gantry rail 72 projects significantly from the side support 74 on the trailing edge side 56 of the mould 44.

Figure 7C:
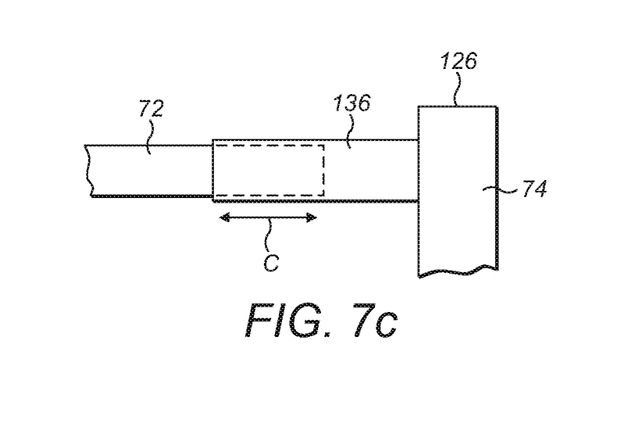
FIG. 7c shows a telescopic connection between the gantry and a side support.

Referring to FIG. 7c, in a variant of the invention a telescopic connection is employed between the gantry rail 72 and the side supports 74. In this embodiment, the upper ends 126 of the respective side supports 74 are each provided with a horizontal outer tubular member 136 within which the gantry rail 72 is slidably received. As the separation between the tracks 66, 68 varies, the outer tubular members 136 move telescopically with respect to the gantry rail 72 to allow the side supports 74 to move relative to one another in the chordwise direction C to vary the effective width of the gantry 72.

Figure 8:
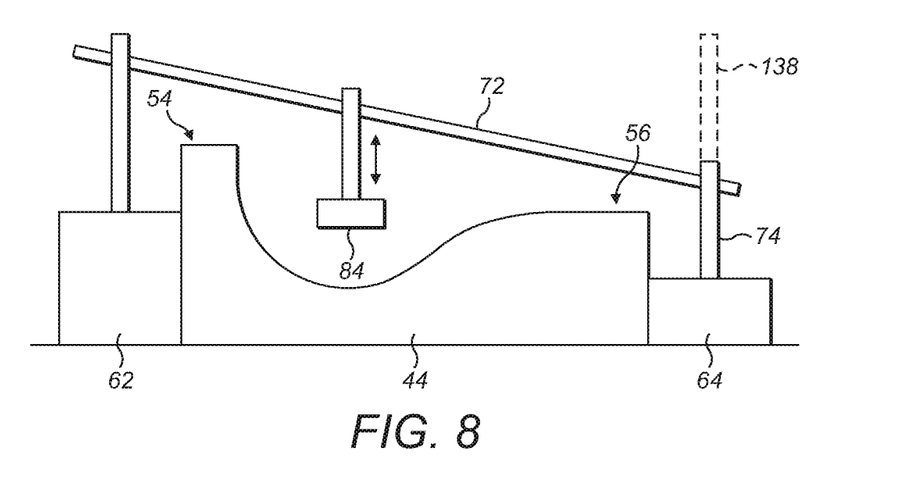
FIG. 8 is a cross-section through the production system of FIG. 3, showing the gantry in a region where the walkways on respective sides of the mould are at different heights.
Figure 9:
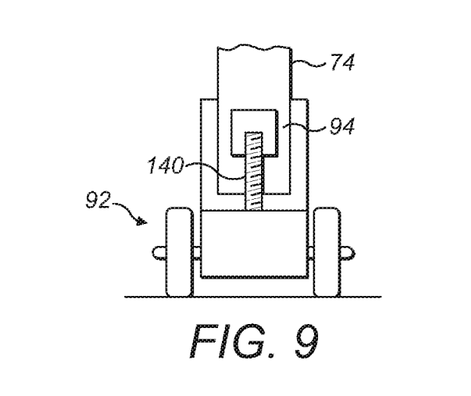
FIG. 9 is a close-up view of a roller assembly comprising an actuator for varying the height of the side support.

Referring to FIG. 8, in some regions of the mould 44, the leading edge 54 and the trailing edge 56 may be of different heights. In these regions, the adjacent walkways 62, 64 alongside the leading and trailing edges 54, 56 are also of differing heights, and hence the tracks on the walkways 62, 64 are of different heights. As shown in FIG. 8, this can result in the gantry rail 72 sloping downwardly towards the lower side of the mould 44. To adjust for this, the vertical position of the end effector unit 84 may be controlled dynamically. Alternatively, the height of the side supports 74 may be controlled dynamically, as indicated by the dashed area 138 in FIG. 8. For the avoidance of doubt, the tracks and the wheel units have been omitted from FIG. 8 for clarity purposes Referring to FIG. 9, this shows a pneumatic actuator 140 provided between the wheel unit 92 and the base 94 of the vertical side support 74. The actuator 140 is controlled to raise or lower the height of the side support 74 depending upon the changing height difference between the walkways 62, 64 thereby maintaining the gantry rail 72 substantially horizontal as the gantry 72 moves longitudinally above the mould 44.

Figure 10:
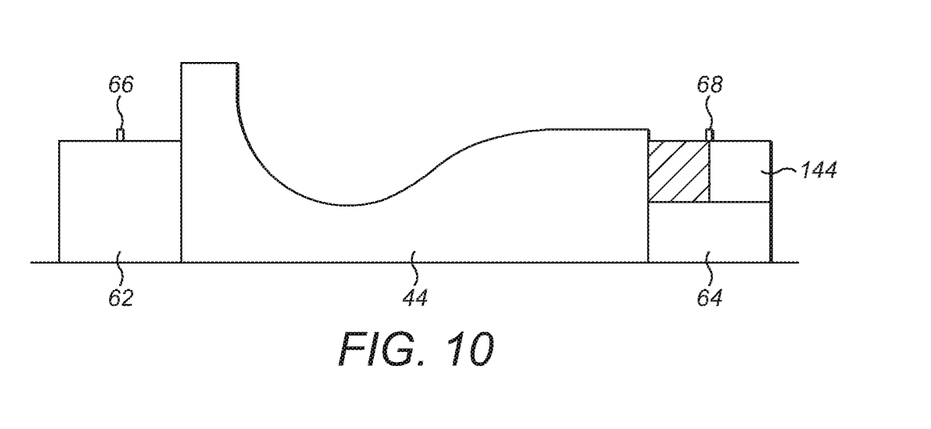
FIG. 10 shows one of the walkways built up so that it is level with the other walkway.

Referring to FIG. 10, instead of dynamically varying the height of the side supports 74, the walkways 62, 64 may alternatively be built up using blocks 144 or other suitable means in relatively low regions of the mould 44 so that the tracks 66, 68 on each side of the mould 44 are at substantially the same height all the way along the mould 44.

Figure 11:
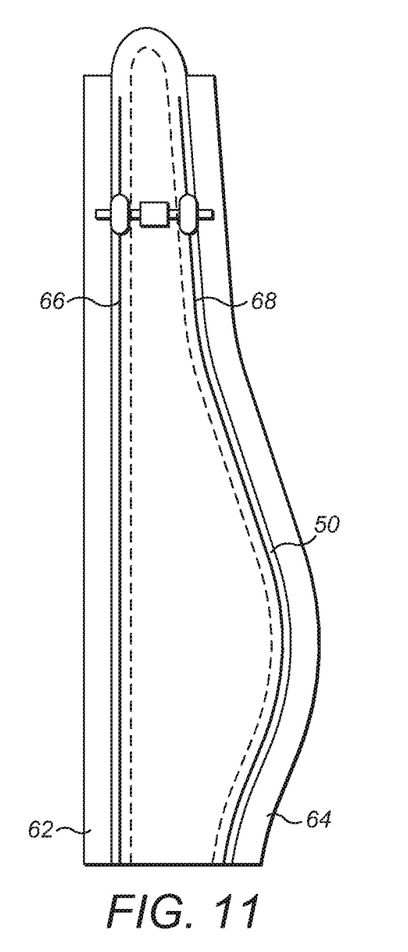
FIG. 11 is a plan view of a variant of the production system of FIG. 3, in which the tracks are provided on the mould flange.
Figure 12:
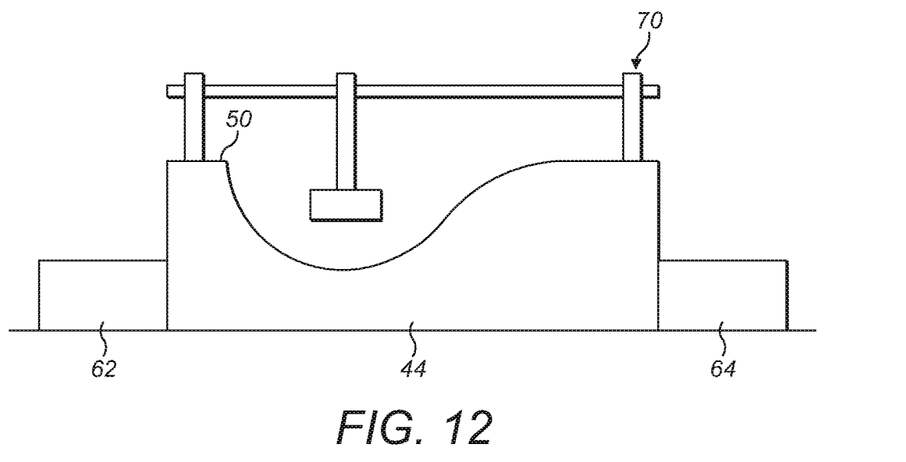
FIG. 12 is a cross-sectional view of the production system of FIG. 11.
Figure 13:
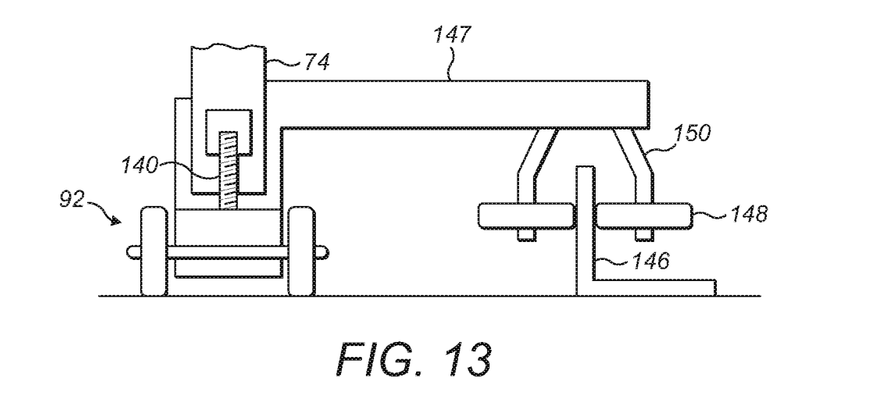

A further variant of the production system is shown in plan view in FIG. 11. In this example, the tracks 66, 68 are provided on the mould flange 50 instead of on the walkways 62, 64. The other features of the system described above may also be employed with this arrangement. Conveniently, the walkways 62, 64 in this example are encumbered by the tracks 66, 68. FIG. 12 shows a cross-section of the production system of FIG. 11, showing the transport assembly 70 supported on the mould flange. For the avoidance of doubt, the tracks and the wheel units have been omitted from FIG. 12 for clarity purposes FIG. 13 shows a variant of the track and wheel unit of FIG. 6a. Referring to FIG. 13, in this arrangement the track is defined by a single upstanding flange 146, and the side support 74 is arranged to roll alongside the flange 146. A side-arm 147 is mounted to the base 94 of the side support 74. The side arm 147 extends perpendicular to the vertical side support 74. The side arm 147 is provided with a pair of wheels 148 arranged to turn about a pair of vertical axles 150. The wheels 148 are provided respectively on opposite sides of the flange 146 and are arranged to clamp the side arm 147 to the flange 147. The flange 147 is arranged to follow the curvature of the mould, and may be provided on a walkway or on the mould flange.

Figure 14A:
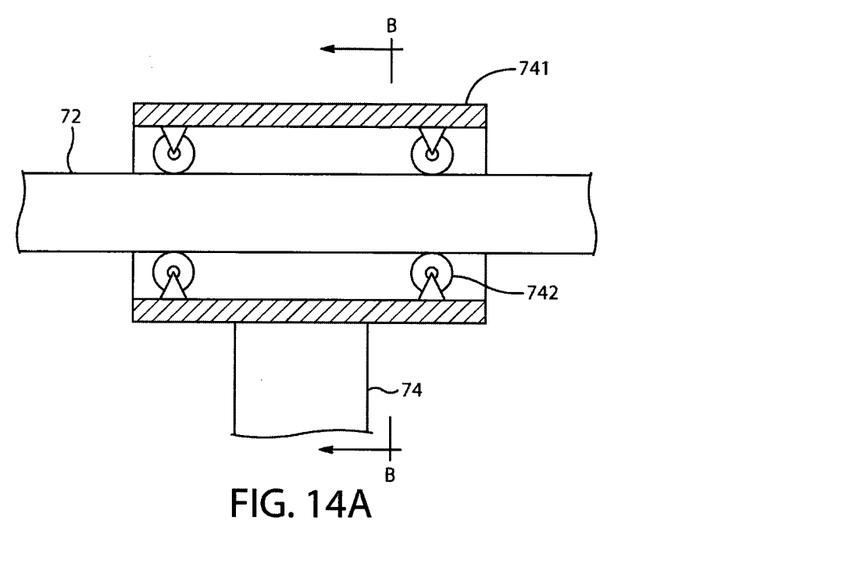
FIG. 14 shows two vertically sectioned views of an alternative to the embodiments in FIG. 7a-7c of the coupling between the gantry and one of the side supports 74.
Figure 14B:
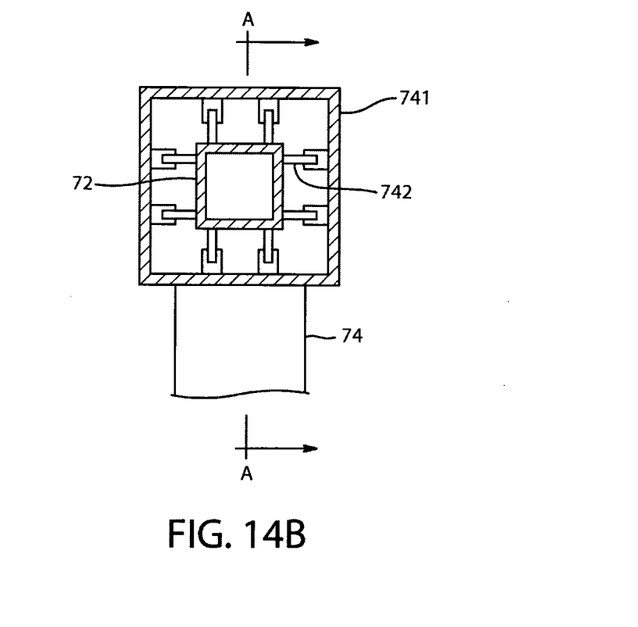

FIG. 14 shows an alternative to the embodiments described above with reference to FIG. 7a-7c of the coupling between the gantry rail 72 and one of the side supports 74. The gantry rail 72 is provided in the form of a steel beam with a hollow rectangular cross-section. The gantry rail 72 extends through a roller holder 741 fixed to the top of the side support 74. The roller holder 741 also has a hollow rectangular cross-section, which is oriented with its walls in parallel to corresponding walls of the gantry rail 72. Inside the roller holder, 741, rollers 742 are mounted. The rollers 742 are adapted to roll on the external surface of the gantry beam 72. The embodiment shown in FIG. 14 is suitably combined with the bogie assembly described above with reference to FIG. 6c, i.e. where the bogie assembly is pivotally mounted to the base of the side support 74.

Various modifications may be made to the examples described above without departing from the scope of the present invention as defined in the following claims. For example, alternative embodiments are envisaged in which the tracks are provided outboard of the walkway, for example on the factory floor. The varying separation between the tracks in such examples still allows the tracks to follow the contour of the mould and hence free up factory floor space adjacent the mould assembly compared to prior art examples that employ parallel straight tracks along the entire length of the mould.

The invention claimed is:

1. A production system for a wind turbine component, the system comprising:
   an elongate mould assembly extending in a longitudinal direction, the mould assembly comprising a mould surface and having a width that varies in the longitudinal direction;
   first and second tracks defined respectively on opposite longitudinal sides of the mould surface, the tracks extending at least partially longitudinally; and
   a transport assembly moveable relative to the mould assembly in the longitudinal direction, the transport assembly comprising a pair of side supports arranged respectively to move along the first and second tracks, and a gantry supported above the mould assembly by the pair of side supports, the gantry extending transverse to the longitudinal direction, characterised in that the perpendicular distance between the respective tracks varies along the length of the tracks; and
   the transport assembly is configured such that the side supports move relative to one another in a direction transverse to the longitudinal direction in accordance with the varying distance between the tracks as the transport assembly moves in the longitudinal direction.

2. The production system of claim 1, further comprising a walkway provided alongside the mould assembly, wherein one of the tracks is provided on the walkway.

3. The production system of claim 2, comprising first and second walkways provided respectively alongside first and second longitudinal sides of the mould assembly, wherein the first and second tracks are provided respectively on the first and second walkways.

4. The production system of claim 1, wherein the mould surface is at least partially surrounded by a mould flange, and wherein at least one of the tracks is provided on the mould flange.

5. The production system of claim 4, wherein both of the tracks are provided on the mould flange.

6. The production system of claim 1, wherein at least one of the tracks follows a contour of the mould assembly.

7. The production system of claim 6, wherein the distance between the tracks decreases in a direction in which the mould assembly becomes narrower.

8. The production system of claim 1, wherein at least one of the tracks defines a curved path.

9. The production system of claim 1, wherein the gantry is slidably mounted with respect to one or both side supports.

10. The production system of claim 9, wherein the gantry is telescopically arranged with respect to at least one of the side supports to effect relative movement of the side supports transverse to the longitudinal direction.

11. The production system of claim 1, further comprising an articulated joint between the gantry and at least one of the side supports.

12. The production system of claim 1, wherein a base portion of at least one of the side supports is provided with wheels that are able to turn relative to the side support.

13. The production system of claim 1, wherein the transport assembly comprises means for dynamically varying the height of at least one of the side supports as the transport assembly moves in the longitudinal direction.

14. A method of making an elongate wind turbine component, the method comprising:
    providing an elongate mould assembly extending in a longitudinal direction, the mould assembly comprising a mould surface and having a width that varies in the longitudinal direction;
    defining first and second tracks respectively on opposite longitudinal sides of the mould surface, the tracks extending at least partially longitudinally and the perpendicular distance between the tracks varying along the length of the tracks;
    providing a transport assembly comprising a pair of side supports arranged respectively to move along the first and second tracks, and a gantry supported above the mould assembly by the pair of side supports, the gantry extending transverse to the longitudinal direction;
    moving the transport assembly relative to the mould assembly in the longitudinal direction;
    depositing material in the mould by means of the transport assembly; and moving the side supports relative to one another in a direction transverse to the longitudinal direction in accordance with the varying distance between the tracks as the transport assembly moves in the longitudinal direction.

15. The method of claim 14, further comprising providing at least one of the tracks on a walkway alongside the mould assembly.

16. The method of claim 14, further comprising providing at least one of the tracks on a mould flange, which at least partially surrounds the mould surface.

17. The method of any of claim 14, further comprising varying the height of at least one of the side supports in accordance with a varying height differential between the first and second tracks and thereby maintaining the gantry in a substantially horizontal orientation as the transport assembly moves in the longitudinal direction.

18. The production system of claim 1 wherein the mould assembly comprises a mould for a wind turbine blade.

19. The production system of claim 1, wherein the side supports are configured to move along the respective first and second tracks simultaneously as the transport assembly moves in the longitudinal direction.

20. The production system of claim 1, wherein the transport assembly is configured such that the side supports are fixed relative to one another in the longitudinal direction as the transport assembly moves in the longitudinal direction.

* * * * *